(12) United States Patent
Iwai

(10) Patent No.: US 6,204,910 B1
(45) Date of Patent: Mar. 20, 2001

(54) IMAGE PROCESSING SYSTEM OPERABLE AT HIGH SPEED

(75) Inventor: Kenichi Iwai, Kawasaki (JP)

(73) Assignees: Toshiba Tec Kabushiki Kaisha, Tokyo; Kabushiki Kaisha Toshiba, Kawasaki, both of (JP)

(*) Notice: Subject to any disclaimer, the term of this patent is extended or adjusted under 35 U.S.C. 154(b) by 0 days.

(21) Appl. No.: 09/387,511

(22) Filed: Sep. 1, 1999

(30) Foreign Application Priority Data

Sep. 3, 1998 (JP) .................................. 10-249858

(51) Int. Cl.$^7$ .......................... G03B 27/52; B41J 2/435; H04N 1/32; H04N 1/04
(52) U.S. Cl. ........................... 355/41; 347/249; 358/442; 358/483; 358/468
(58) Field of Search ................................ 355/41; 347/249; 358/442, 483, 468

(56) References Cited

U.S. PATENT DOCUMENTS

| | | | |
|---|---|---|---|
| 4,686,571 | 8/1987 | Suzuki ................................ | 358/213 |
| 4,703,364 * | 10/1987 | Asada et al. ......................... | 358/285 |
| 4,916,551 * | 4/1990 | Lin et al. ............................. | 358/483 |
| 4,918,542 | 4/1990 | Nagashima et al. ................. | 358/451 |
| 4,924,307 | 5/1990 | Landowski et al. ................. | 358/107 |
| 5,036,397 * | 7/1991 | Nagabusa ............................ | 358/483 |
| 5,117,243 * | 5/1992 | Swanberg et al. .................. | 346/108 |
| 5,162,917 * | 11/1992 | Sugishima ........................... | 358/296 |
| 5,283,662 | 2/1994 | Nakajima ............................ | 358/409 |
| 5,285,295 * | 2/1994 | Kai et al. ............................. | 358/482 |
| 5,452,109 * | 9/1995 | Compton ............................. | 358/482 |
| 5,461,491 | 10/1995 | Degi .................................... | 358/482 |
| 5,640,251 * | 6/1997 | Tone et al. .......................... | 358/482 |
| 5,687,003 * | 11/1997 | Nagano ............................... | 358/445 |
| 5,742,406 | 4/1998 | Suzuki ................................ | 358/468 |
| 5,761,480 * | 6/1998 | Fukada et al. ...................... | 358/442 |
| 5,793,496 | 8/1998 | Morigami ............................ | 358/296 |
| 5,902,993 * | 5/1999 | Okushiba et al. ................... | 358/483 |
| 6,038,038 * | 3/2000 | Selby et al. ......................... | 358/446 |
| 6,049,351 * | 4/2000 | Noguchi et al. .................... | 347/249 |

FOREIGN PATENT DOCUMENTS

| | | |
|---|---|---|
| 4-078270 | 3/1992 | (JP) . |
| 7-184156 | 7/1995 | (JP) . |
| 7-312717 | 11/1995 | (JP) . |
| 8-8640 | 1/1996 | (JP) . |
| 8-28792 | 3/1996 | (JP) . |
| 2547742 | 8/1996 | (JP) . |
| 9-130655 | 5/1997 | (JP) . |
| 9-161048 | 6/1997 | (JP) . |
| 10-336452 | 12/1998 | (JP) . |

OTHER PUBLICATIONS

L.L. Johnson and R. T. Joseph, Random Timing Generator, IBM Technical Disclosure Bulletin, vol. 12 No. 4 Sep. 1969.*

* cited by examiner

Primary Examiner—Russell Adams
Assistant Examiner—Khaled Brown
(74) Attorney, Agent, or Firm—Foley & Lardner

(57) ABSTRACT

An image processing apparatus processes an image signal obtained by subjecting optical image information to photo-electric conversion. An image fetch circuit converts the image signal into a digital signal and outputs it as input image data of one line. An image data processing circuit fetches the input image data of one line from the image fetch circuit in units of one pixel, and subjects it to predetermined image processing. A drive circuit at least supplies the image fetch circuit with a predetermined drive pulse signal which enables a high-speed operation of the image fetch circuit. A timing setting circuit programs, from the outside, timing of the drive pulse signal supplied from the drive circuit.

6 Claims, 5 Drawing Sheets

IMAGE PROCESSING SYSTEM OPERABLE AT HIGH SPEED

BACKGROUND OF THE INVENTION

This invention relates to an image processing system, and more particularly to an image processing system including an image processing apparatus and method, which can process, at a high speed and in a simple, reliable and accurate manner, image data supplied in the form of an image signal from a scanner that uses, for example, a charge-coupled device (CCD) as a photoelectric element.

In an image processing apparatus such as an electronic copy machine, a digital copy machine (PPC), a facsimile, etc., it is common knowledge that a charge-coupled device (CCD), for example, is used as a photoelectric element which is provided in a scanner section for reading an image.

Concerning the control of the CCD, in general, the higher the reading speed, the higher the frequency used for forwarding pixels, and the more difficult it is to handle the signals of the CCD.

In light of this, in the conventional medium-speed digital PPC, pixels in the image area of the CCD are divided into an odd group and an even group, thereby performing high-speed processing.

Since, however, the driving speed of a CCD designed for the conventional medium-speed digital PPC, i.e. the transfer rate of pixel signals, is not so high, not so strict timing signal generation accuracy is demanded of the drive pulse generating means for generating drive pulses to be supplied to the CCD, amplifiers (Amp) and analog/digital converters (ADCs) included in a preprocessing system, i.e. to be supplied to a CCD/preprocessing-large-scale-integrated-circuit (LSI) drive block provided in an application specific integrated circuit (ASIC) for scanning.

Since there is enough time in the control of a CCD designed for the medium-speed digital PPC, the timing relationship between drive pulses which satisfies the demanded specifications of the CCD and the LSI (Amp, ADC) for preprocessing can be obtained, using no setting means for timing adjustment but substantially fixed values.

Also, in the control of a CCD designed for the medium-speed digital PPC, not so high A/D conversion speed is required when the pixel signal (analog signal) of the CCD sampled and amplified by the Amp is A/D converted by the ADC into an 8-bit digital signal (image data), which is input to the scanner ASIC and subjected to data processing such as shading correction.

Accordingly, even when in the control of the CCD of the medium-speed digital PPC, image data output from the ADC in synchronism with its A/D conversion clock signal is input to the scanner ASIC, it can be latched by the scanner ASIC, without any problem, using a clock signal employed therein.

However, where the preprocessing system is constructed using a 4-channel output CCD designed for a high-speed digital PPC, in order to enhance the speed of the scanner, the driving speed of the CCD, i.e. the transfer rate of a pixel signal, is rather high, and therefore very strict timing signal generation accuracy is demanded of the drive pulse generating means for generating drive pulses to be supplied to the CCD and the amplifiers (Amp) incorporated in the preprocessing system, i.e., against the CCD/preprocessing-LSI drive block in the scanner ASIC.

In other words, in the control of the CCD designed for the high-speed digital PPC, it is necessary to create and keep, within a very short period in time, the timing relationship between the drive pulses which satisfies the demanded specifications of the CCD and the preprocessing LSI (Amp, ADC).

To this end, setting means for timing adjustment is also necessary in the control of the CCD designed for the high-speed digital PPC.

Further, in the control of the CCD designed for the high-speed digital PPC, high A/D conversion speed is required when the pixel signal (analog signal) of the CCD sampled and amplified by the Amp is A/D converted by the ADC into an 8-bit digital signal (indicative of image data), which is input to the scanner ASIC and subjected to data processing such as shading correction.

Accordingly, in the control of the CCD designed for the high-speed digital PPC, the scanner ASIC needs input means for reliably latching image data output from the ADC in synchronism with an A/D conversion clock signal.

In other words, even if the conventional image processing system performs control using a 4-channel output CCD designed for the high-speed digital PPC, it cannot perform high speed control since it is intended for the 2-channel output CCD designed for the medium-speed digital PPC.

BRIEF SUMMARY OF THE INVENTION

The present invention has been developed in light of the above, and is aimed at providing an image processing system including an image processing apparatus and method, which can process, at a high speed and in a simple, reliable and accurate manner, image data supplied in the form of an image signal from a scanner that uses, for example, a charge-coupled device (CCD) as a photoelectric element.

According to an aspect of the invention, there is provided an image processing apparatus for processing an image signal obtained by subjecting optical image information to photoelectric conversion, comprising:

an image fetch circuit for converting the image signal into a digital signal and outputting it as input image data of one line;

an image data processing circuit for fetching the input image data of one line from the image fetch circuit in units of one pixel, and subjecting it to predetermined image processing;

a drive circuit for at least supplying the image fetch circuit with a predetermined drive pulse signal which enables a high-speed operation of the image fetch circuit; and a timing setting circuit for programming, from the outside, timing of the drive pulse signal supplied from the drive circuit.

According to another aspect of the invention, there is provided an image processing apparatus comprising:

an accumulating section for accumulating, in elements of one line, electric signals obtained by subjecting optical image information to photoelectric conversion;

an image reading section for reading, in a plurality of predetermined directions, the electric signals accumulated in the elements of one line by the accumulating section, thereby synthesizing the electric signals, converting the synthesized electric signal into a digital signal on the basis of a pulse signal for digital conversion, and outputting the digital signal as input image data of one line;

an image data processing section for fetching, in units of one pixel, the input image data of one line output from the image reading section, thereby performing predetermined image data processing on the basis of a master clock signal; and a drive section for supplying the digital conversion pulse signal to be used in the image reading section, and the master clock signal to be used in the image data processing section, such that the digital conversion pulse signal can be used in place of the master clock signal, or vice versa.

According to a yet further aspect of the invention, there is provided an image processing method comprising the steps of:

converting optical image information into electric signals and accumulating the electric signals in elements of one line;

supplying a digital conversion pulse signal and a master clock signal such that the digital conversion pulse signal can be used in place of the master clock signal, or vice versa;

programming timing of the digital conversion pulse signal;

reading the electric signals from the elements of one line in a plurality of predetermined directions, thereby synthesizing the electric signals, converting the synthesized electric signal into a digital signal on the basis of the digital conversion pulse signal, and outputting the digital signal as input image data of one line;

generating an input data latching clock signal on the basis of the master clock signal;

programming timing of the input data latching clock signal from the outside;

fetching, in units of one pixel, the input image data of one line on the basis of the input data latching clock signal, and performing predetermined image data processing on the basis of the master clock signal; and synchronizing, with the master clock signal, the input image data fetched on the basis of the input data latching clock signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the present invention and, together with the general description given above and the detailed description of the preferred embodiment given below, serve to explain the principles of the present invention in which.

DETAILED DESCRIPTION OF THE INVENTION

Figure 1:
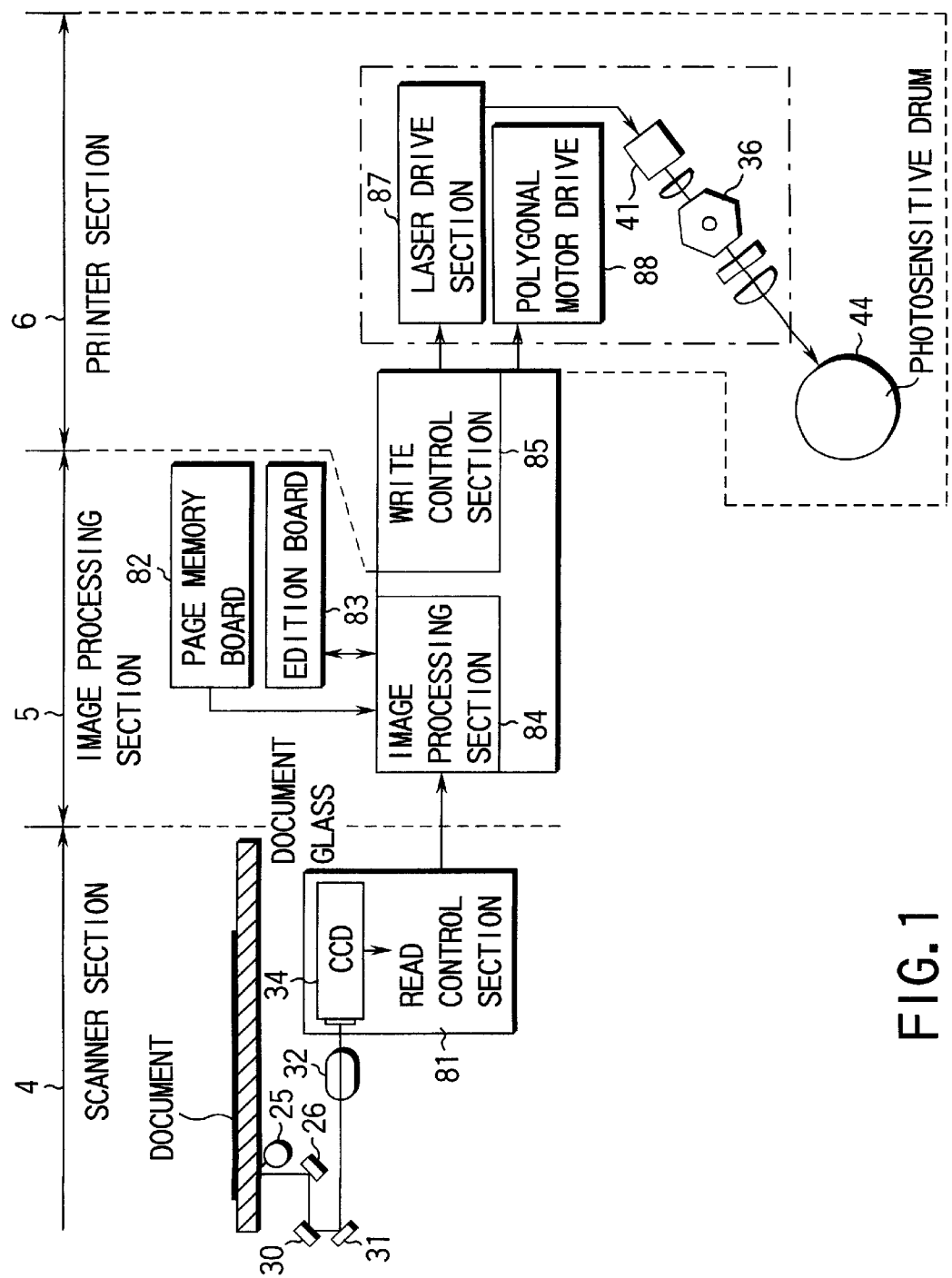
FIG. 1 is a view schematically illustrating a digital copy machine as an image processing apparatus according to the embodiment of the invention.

Reference will now be made in detail to the presently preferred embodiment of the invention as illustrated in the accompanying drawings, in which like reference numerals designate like or corresponding parts.

FIG. 1 schematically shows an essential part of a digital copy machine as an image processing apparatus according to the embodiment of the invention.

The essential part of the digital copy machine comprises a scanner section 4, an image processing section 5 and a printer section 6.

As is shown in FIG. 1, reading of an image of an original document by an essential part of the digital copy machine is performed by directly applying light from an exposure lamp 25 to the original document, and guiding an optical image, corresponding to light reflected from the document, to a 4-channel output CCD 34 via mirrors 26, 30 and 31 and an image forming lens 32.

The 4-channel output CCD 34 is disposed to convert the optical image, by photoelectric conversion, into an electric signal for each of a plurality of light receiving elements (e.g. 7500 elements in the case of 600 dpi), and functions as an accumulation section for accumulating, in light receiving elements of one line, electric signals obtained by subjecting optical image data to photoelectric conversion.

The electric signals are sequentially transferred and output as analog signals via CCD analog shift registers incorporated in the 4-channel output CCD 34.

As is shown in FIG. 1, the control system comprises a read control section 81 including the 4-channel output CCD, a page memory board 82, an edition board 83, an image processing section 84, a write control section 85, a laser driving section 87 and a polygonal motor drive 88, and is constructed such that a laser beam from a semiconductor laser 41 is deflected by a polygonal mirror 36 and guided to a photosensitive drum 44.

Figure 2:
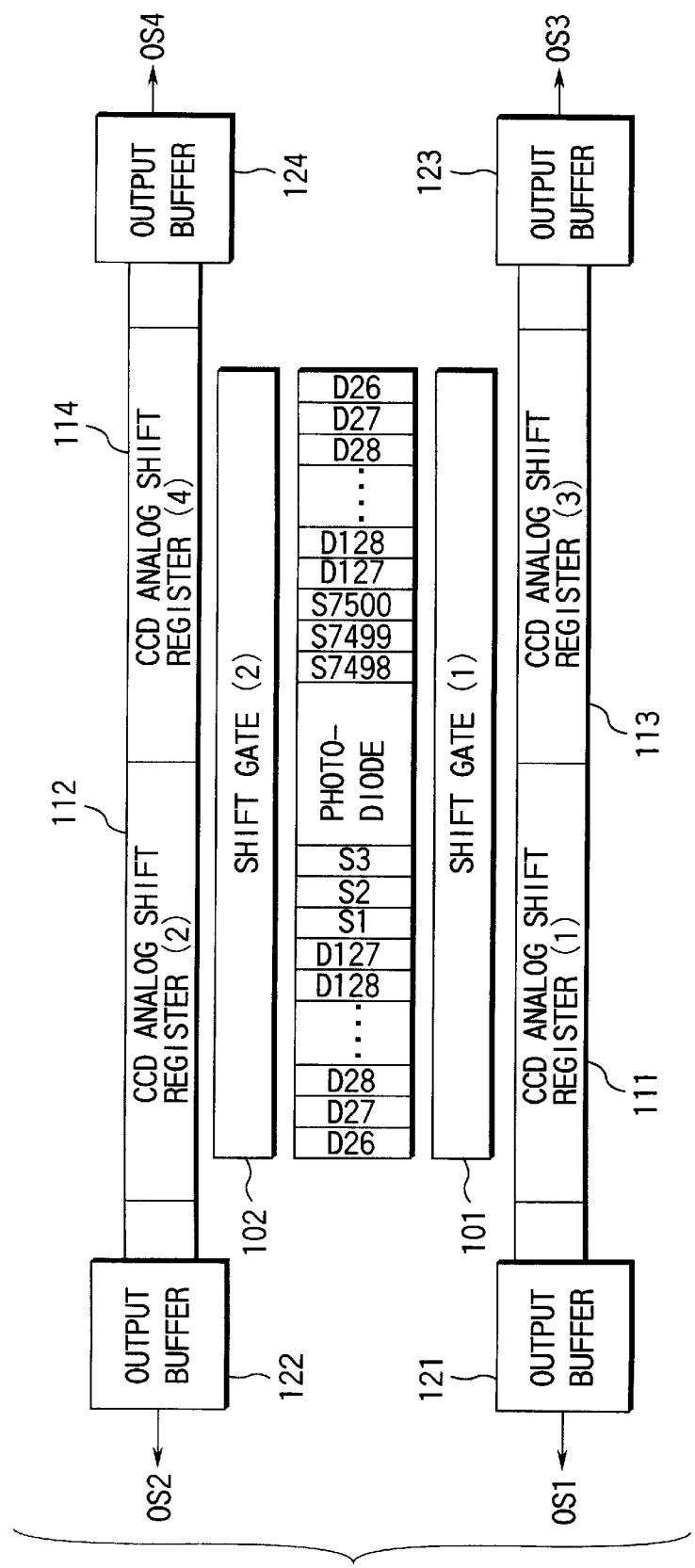
FIG. 2 is a view illustrating the structure of a 4-channel output CCD appearing in FIG. 1.

FIG. 2 shows in detail the structure of the 4-channel output CCD 34. The CCD consists of light receiving elements (for example, photodiodes) S1–S7500 arranged in order, shift gates 101 and 102, CCD analog shift registers 111–114 and output buffers 121–124.

Since the output of the 4-channel output CCD 34 has four components, right-hand and left-hand even components and right-hand and left-hand odd components, as shown in FIG. 2, the CCD 34 employs four CCD analog shift registers 111, 112, 113 and 114.

Accordingly, odd component signals are sequentially transferred and output through the CCD analog shift register 111, beginning from the leftmost light receiving element, and even component signals are sequentially transferred and output through the CCD analog shift register 112, beginning from the leftmost light receiving element. Similarly, odd component signals are sequentially transferred and output through the CCD analog shift register 113, beginning from the rightmost light receiving element, and even component signals are sequentially transferred and output through the CCD analog shift register 114, beginning from the rightmost light receiving element.

The last ones of the left-hand/right-hand odd/even component signals are those from light receiving elements S3749, S3750, S3751 and S3752 arranged adjacent to each other at a central area of the light receiving elements S1–S7500.

Control signals (a transfer clock signal, a shift gate signal, a reset signal and a clamp signal) necessary for driving the 4-channel output CCD 34 are generated by a CCD driving function incorporated in a high-speed scanner controller ASIC, which will be described later.

Figure 3:
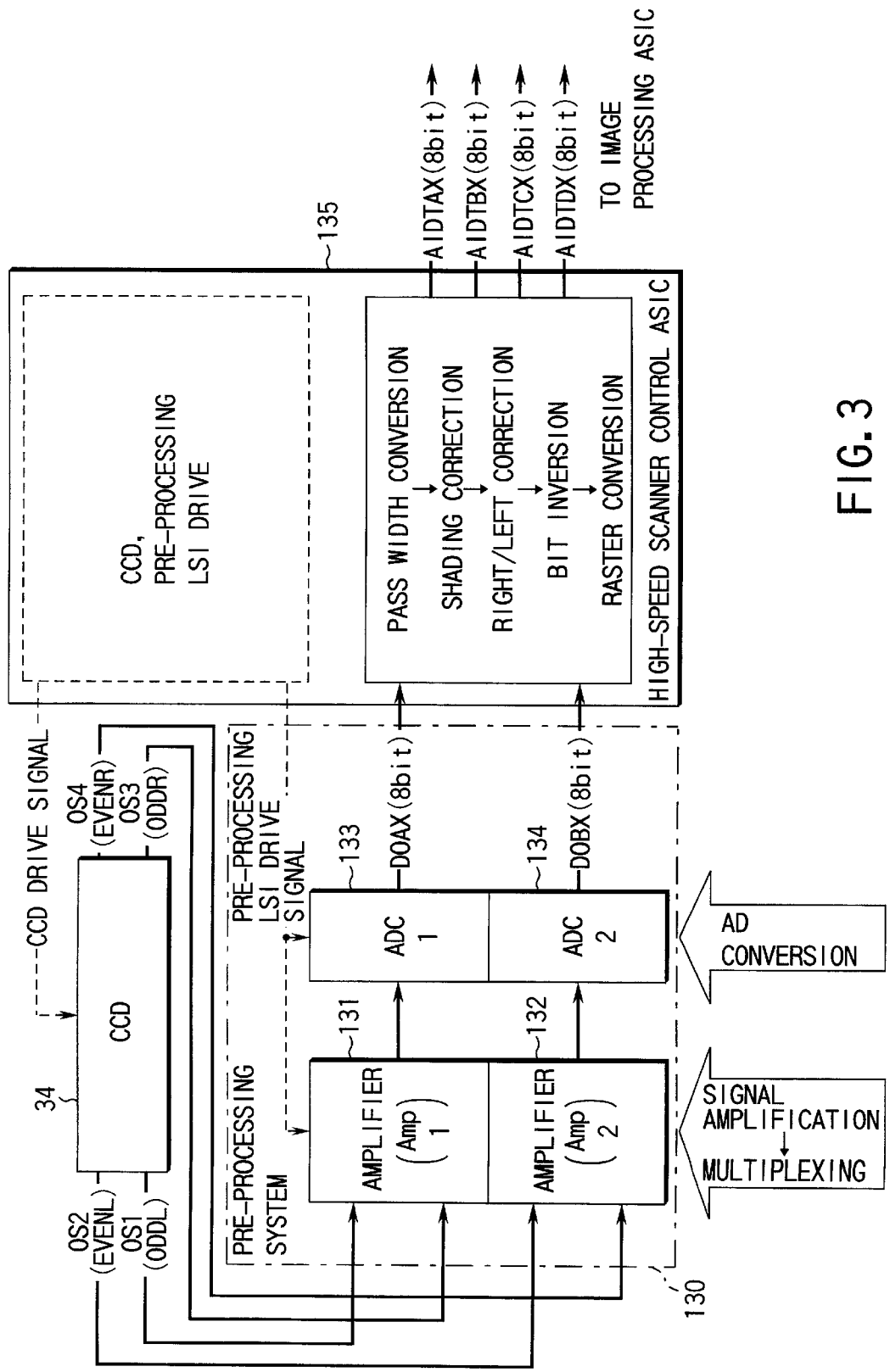
FIG. 3 is a view illustrating a preprocessing system and a high-speed scanner ASIC incorporated in a control section appearing in FIG. 1.

FIG. 3 shows the structures of a preprocessing system 130 and a high-speed scanner control ASIC 135, which are installed in the read control section 81 for transferring image data in the 4-channel output CCD 34.

The preprocessing system 130 comprises amplifiers 131 and 132 and A/D converters (ADC) 133 and 134, and functions as an image reading section or an image fetching section for reading, in a plurality of predetermined directions, electric signals accumulated in the elements of one line incorporated in the 4-channel output CCD as the accumulation section, thereby synthesizing the electric signals, and outputting input image data of one line which corresponds to the synthesized electric signal and is obtained by A/D conversion based on a digital conversion pulse signal.

In the preprocessing system 130, the analog signals output from the 4-channel output CCD 34 are sampled in units of each pixel signal by the amplifiers (Amp: analog signal processing integrated circuits) 131 and 132, and then amplified.

The amplifiers 131 and 132 each consist of one chip and each can process signals of 2 channels by parallel processing.

The amplifier 131 receives odd component pixel signals of right-hand and left-hand channels output from the 4-channel output CCD 34 through the output terminals OS1 and OS3.

The amplifier 132 receives even component pixel signals of right-hand and left-hand channels output from the 4-channel output CCD 34 through the output terminals OS2 and OS4.

In each of the amplifiers 131 and 132, two-channel pixel signals from the right-hand and left-hand parts of the 4-channel output CCD 34 are subjected to parallel processing (sampled and amplified), and then multiplexed into one-channel signals.

In other words, the amplifier 131 multiplexes signals from the right-hand and left-hand odd components into one-channel signals, and outputs them, while the amplifier 132 multiplexes signals from the right-hand and left-hand even components into one-channel signals, and outputs them.

Thus, the amplifier 131 simultaneously processes all right-hand and left-hand odd component pixel signals from the 4-channel output CCD 34, and the amplifier 132 simultaneously processes all right-hand and left-hand even component pixel signals from the 4-channel output CCD 34.

The above structure prevents the right-hand/left-hand odd/even component pixel signals of the 4-channel output CCD 34 from distorting depending upon variations in circuit characteristics of the amplifiers (131, 132) between different chips.

Further, in this case, the signal output rate of the amplifiers 131 and 132 is twice the signal input rate thereof.

The analog signal for each pixel amplified by the amplifier 131 or 132 to an appropriate level in signal processing is converted into a digital signal by the A/D conversion using the A/D converter (ADC 133 or 134).

The amplifier 131 samples, by parallel processing, each pair of odd component pixel signals of right-hand and left-hand channels output from the 4-channel output CCD 34, and amplifies and multiplexes them into a one-channel signal.

Each analog signal output from the amplifier 131 is subjected to A/D conversion by an A/D converter 133.

Similarly, the amplifier 131 samples, by parallel processing, each pair of even component pixel signals of right-hand and left-hand channels output from the 4-channel output CCD 34, and amplifies and multiplexes them into a one-channel signal.

Each analog signal output from the amplifier 132 is subjected to A/D conversion by an A/D converter 134.

Since the resolution of the A/D converters 133 and 134 is 8 bits (bit: 256 steps), 8-bit pixel data can be obtained for one pixel.

The above-described series of processing performed on the basis of image information read by the 4-channel output CCD 34 (information input as optical image data to the 4-channel output CCD 34), i.e. amplification and multiplex of pixel signals (analog signals) output form the 4-channel output CCD 34 using the amplifiers 131 and 132, and A/D conversion of the resultant signals using the A/D converters 133 and 134 to obtain digital signals, is called "preprocessing" in the scanner section 4.

Sections for executing the preprocessing constitute the preprocessing system 130.

Further, control signals (sample-and-hold pulses, multiplex signals, clamp signals) necessary for driving the amplifiers 131 and 132, and an A/D conversion clock signal necessary for the A/D conversion in the A/D converters 133 and 134 are created by the preprocessing-LSI driving function of the high-speed scanner control ASIC 135.

The pre-processed pixel signals (8-bit data for one pixel, it will be hereinafter referred to as "image data") are input to the high-speed scanner control ASIC 135, where they are subjected to shading correction, left/right correction and raster conversion.

Figure 4:
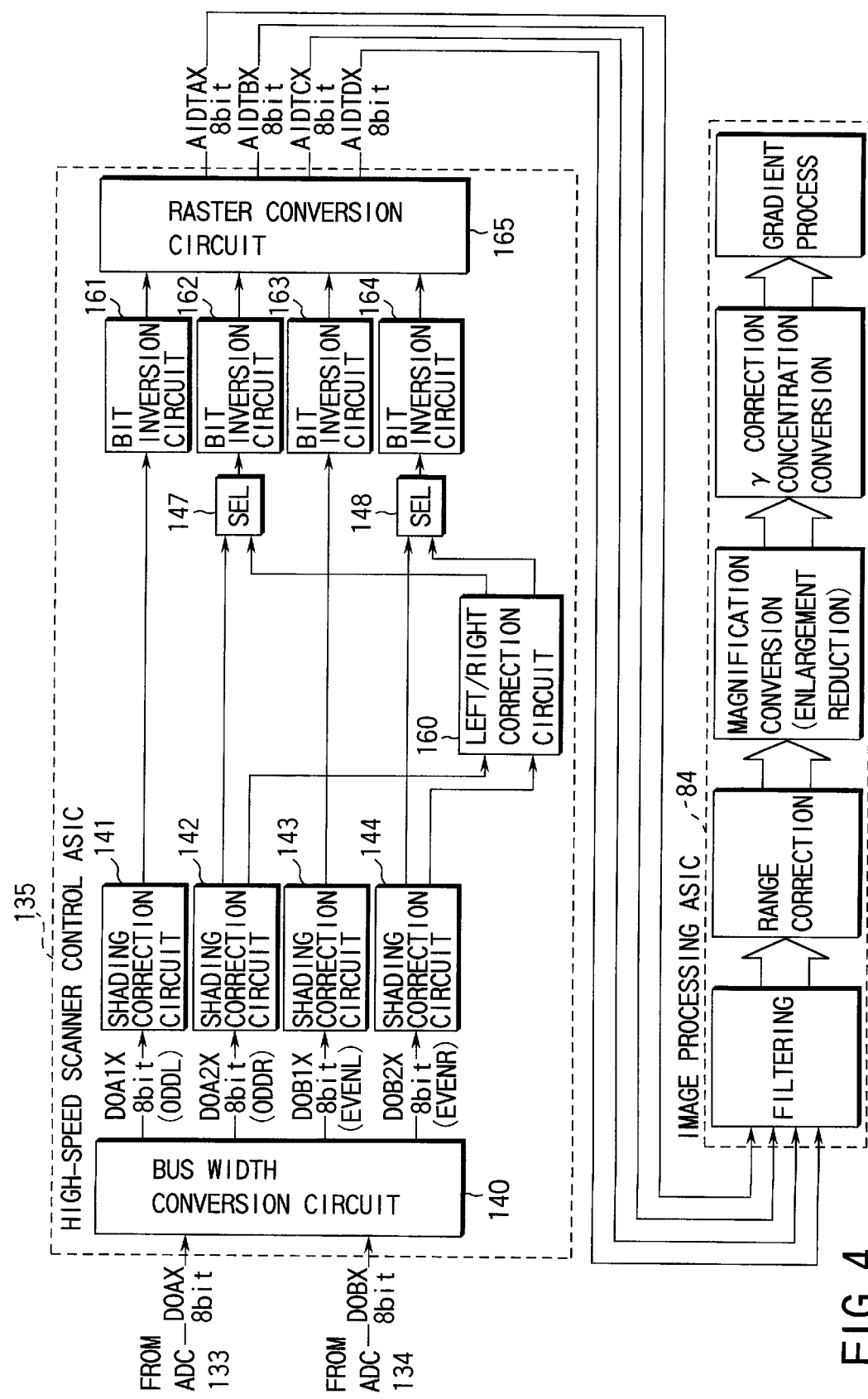
FIG. 4 is a block diagram illustrating the structure of the high-speed scanner ASIC of FIG. 3.

FIG. 4 shows the structure of the high-speed scanner control ASIC 135.

The high-speed scanner control ASIC 135 comprises a bus width conversion circuit 140, shading correction circuits 141–144, bus select circuits (SEL) 147 and 148, a left/right correction circuit 160, bit inversion circuits 161–164 and a raster conversion circuit 165.

As aforementioned, image data pre-processed by the preprocessing system 130 is input, to the high-speed scanner control ASIC 135, as 2-channel data that consists of DOAX (8 bits data obtained by multiplexing right-hand and left-hand odd components) and DOBX (8 bits data obtained by multiplexing right-hand and left-hand even components).

All processes performed in the high-speed scanner control ASIC 135 are performed on image data digitized by the preprocessing system 130.

When image data has been supplied to the bus width conversion circuit 140, it is divided into left-hand odd component data, left-hand even component data, right-hand odd component data and right-hand even component data.

In other words, DOAX (8 bits) obtained by multiplexing right-hand and left-hand odd components is divided by the bus width conversion circuit 140 into DOAX1 (8-bit left-hand odd component data) and DOAX2 (8-bit right-hand odd component data).

Similarly, DOBX (8 bits) obtained by multiplexing right-hand and left-hand even components is divided by the bus width conversion circuit 140 into DOBX1 (8-bit left-hand even component data) and DOBX2 (8-bit right-hand even component data).

Since the image data input as 2-channel data is divided into 4-channel data by the bus width conversion circuit 140, if image data with data rate of 2 channels is input to the circuit 140 as DOAX and DOBX each having a channel of 40 MHz, it outputs DOAX1, DOAX2, DOBX1 and DOBX2 each having a channel of 20 MHz, and supplies them to the next circuit.

The respective image data items DOAX1 (8-bit left-hand odd component data), DOAX2 (8-bit right-hand odd component data), DOBX1 (8-bit left-hand even component data) and DOBX2 (8-bit right-hand even component data) divided by the bus width conversion processing are supplied to the shading correction circuits 141–144, where they are subjected to shading correction.

Since the high-speed scanner control ASIC 135 incorporates four shading correction circuits as shown in FIG. 4, the image data items of 4 channels, DOAX1, DOAX2, DOBX1 and DOBX2, obtained by the bus width conversion processing can be processed simultaneously by parallel processing.

The image data items subjected to the shading correction are supplied to the left/right correction circuit 160, where left-hand odd and even components and the right-hand odd and even components are corrected, respectively. The resultant image data items are subjected to bit inversion processing in the bit inversion circuits 161–164, and then to order adjustment processing in the raster conversion circuit 165.

Variations in image concentration gradient, which occur between pixels, are corrected by the shading correcting function, while variations in linearity with respect to the image concentration, which occur between left-hand and right-hand image data items (signal transmission lines (processing routes)), are corrected by the left/right correction circuit 160.

The image data items obtained by the above-described series of processing in the high-speed scanner control ASIC 135 are output therefrom as AIDTAX (8 bits), AIDTBX (8 bits), AIDTCX (8 bits) and AIDTDX (8 bits), to an image processing ASIC 84.

In the image processing ASIC 84, the image data items are subjected to a series of processes such as a filtering process, a range correction process, a magnification changing process (enlargement, reduction), a γ correction concentration converting processing, a gradient processing.

Where the preprocessing system is constructed using the above-described 4-channel output CCD designed for the high-speed digital PPC, to enhance the operation speed of the scanner, very high timing signal generation accuracy is required for the CCD drive pulse generating means and the Amp drive pulse generating means in the preprocessing system, i.e. for the CCD/preprocessing-LSI drive block in the scanner ASIC.

Specifically, when controlling, for example, the CCD employed in the high-speed digital PPC, it is necessary to generate and maintain the timing relationship between drive pulses corresponding to the specification of the CCD and the preprocessing-LSI (Amp, ADC) within a very small amount of time.

Accordingly, when controlling, for example, the CCD employed in the high-speed digital PPC, it is also necessary to prepare setting means for timing adjustment of drive pulses corresponding to the specification of the CCD and the preprocessing-LSI (Amp, ADC).

Moreover, in the control of the CCD employed in the high-speed digital PPC, high A/D conversion speed is required when the pixel signal (analog signal) of the CCD sampled and amplified by the Amp is A/D converted by the ADC into an 8-bit digital signal (indicative of image data), which is input to the scanner ASIC and subjected to data processing such as shading correction.

Accordingly, in the control of the CCD designed for the high-speed digital PPC, the scanner ASIC needs input means for reliably latching image data output from the ADC in synchronism with an A/D conversion clock signal.

However, even if, as described in the section "Background of the Invention", the conventional image processing system performs control using a 4-channel output CCD designed for a high-speed digital PPC, it cannot perform high speed control since it is intended for a 2-channel output CCD designed for the medium-speed digital PPC.

A description will be given of an essential part of the present invention, which is provided for realizing an image forming apparatus and its control method intended for using, as an image reading photoelectric conversion element in its scanner section, a 4-channel output CCD (charge coupled device) designed for a high-speed digital PPC, and capable of performing high-speed operations in a simple, reliable and accurate manner by, in particular, providing setting means for adjusting the timing of drive pulses corresponding to the specifications of the CCD and the preprocessing-LSI (Amp, ADC), and input means for reliably latching, on the scanner ASIC, image data output from the ADC in synchronism with an A/D conversion clock signal.

The image processing apparatus of the invention is mainly applicable to, for example, a scanner control ASIC employed in a high-speed digital PPC.

Figure 5:
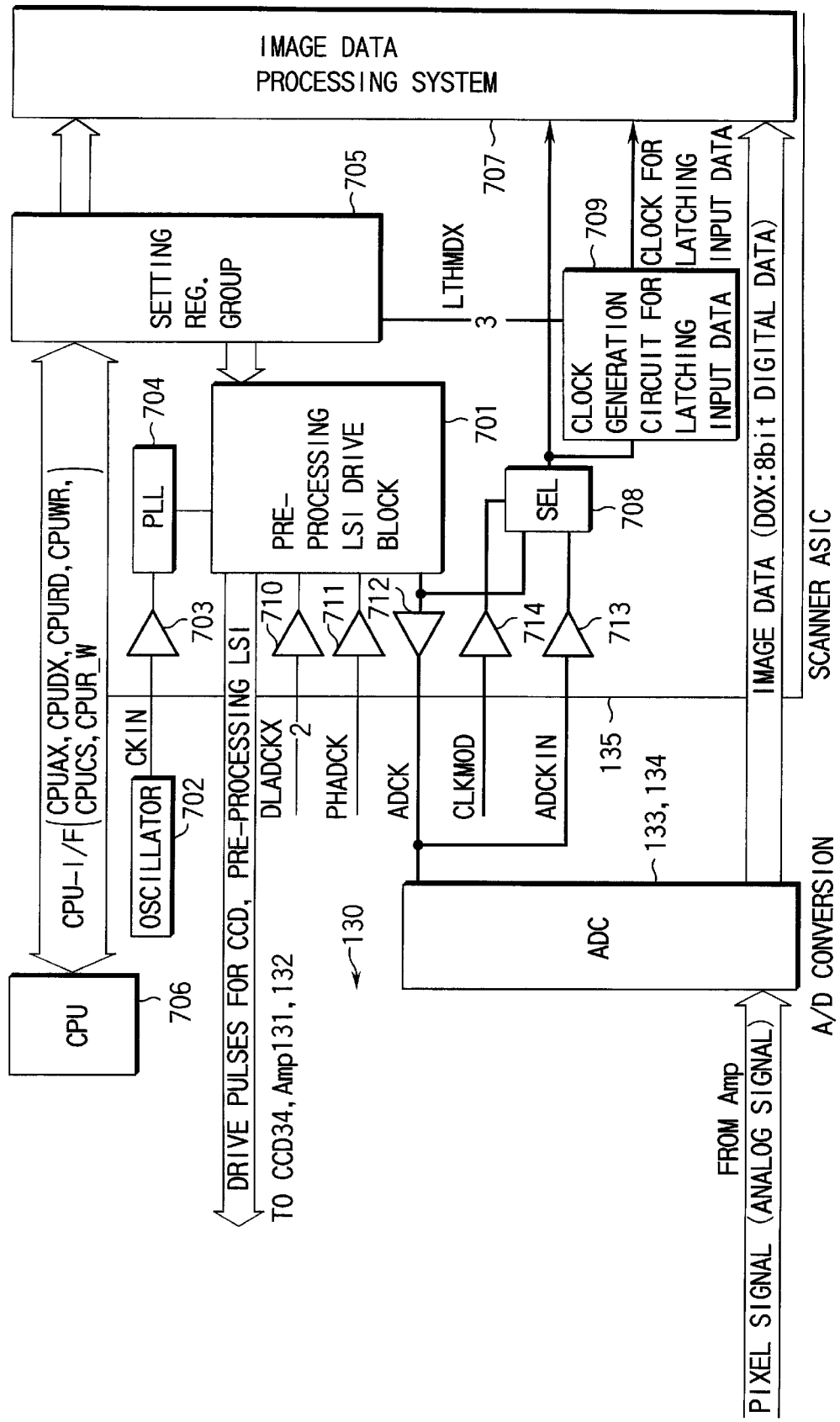
FIG. 5 is a block diagram showing an essential part of the present invention.

FIG. 5 is a block diagram illustrating the essential part of the invention.

In FIG. 5, the portions emphasized by the bold lines relates to the invention.

As will be described later, the invention mainly includes three means. Before referring to the three means, a CCD/preprocessing-LSI drive block 701 employed in the scanner ASIC (high-speed scanner control ASIC) 135 that is operable at high speed will be described with reference to FIG. 5.

The CCD/preprocessing-LSI drive block 701 generates various drive pulses on the basis of a clock signal of 40 MHz that is obtained by multiplying, by 4 using a phase synchronization circuit (PLL) 704, an original clock signal (CKIN) of, for example, 10 MHz output to the circuit 704 via an input buffer circuit 703 from an oscillator 702 provided outside the high-speed scanner control ASIC 135.

The timing of drive pulses generated by the CCD/preprocessing-LSI drive block 701 can be programmed from the outside in order to adjust them to the high-speed operations of the 4-channel output CCD 34 and the preprocessing (LSI) system 130.

Registers to be exclusively used for setting parameters for the timing adjustment are provided in a setting REG group 705 incorporated in the high-speed scanner control ASIC 135.

The timing of each drive pulse generated by the CCD/preprocessing-LSI drive block 701 can be changed by setting desired data in the setting REG group 705 with exclusive registers for parameter setting, using, for example, a CPU 706 which is provided outside the high-speed scanner control ASIC 135.

In other words, the CCD/preprocessing-LSI drive block 701 functions as a timing signal generator.

An A/D conversion clock signal (ADCK), which is included in drive pulse signals output from the preprocessing-LSI drive block 701 and generated for the A/D converters 133 and 134 in the preprocessing (LSI) system 130, has its generation point in time set changeable from the outside via input buffer circuits 710 and 711, by providing exclusive external input terminals (PHADCK, DLADCKX) in the preprocessing-LSI drive block 701.

As will be described later in detail, the ADCK is also used as a master clock signal for an image data processing system 707 provided in the high-speed scanner control ASIC 135. Accordingly, it is necessary to fix the timing of generation of the ADCK when the power is turned on. This being so, the timing is disposed changeable.

As described above, the timing of the drive pulses generated by the CCD/preprocessing-LSI drive block 701 can be programmed from the outside in order to adjust them to the high-speed operations of the 4-channel output CCD 34 and the preprocessing (LSI) system 130.

This is because it is necessary for the high-speed scanner control ASIC 135 to reliably fetch image data input through the A/D converters 133 and 134 in the preprocessing (LSI) system 130 whichever setting is made, within the parameter setting range of the exclusive timing adjusting registers employed in the setting REG group 705 of the ASIC 135, for the various drive pulses generated by the CCD/preprocessing-LSI drive block 701 in order to satisfy the drive specifications of the 4-channel output CCD 34 and the preprocessing (LSI) system 130.

Further, in the preprocessing (LSI) system 130, the transfer rate of each image data item (DOX) of 8 bits is very high, which is digitized by A/D converting, using the ADC 133 or 134, an image pixel signal (analog signal) sampled and amplified by the amplifier 131 or 132 and output from the 4-channel output CCD 34.

Moreover, it is necessary to consider, for example, a delay between the ADCK outside the ASIC and the ADCK inside the ASIC due to the transmission route condition on the substrate, or the data output delay of the ADC with respect to the ADCK output from the ASIC to the ADC.

The invention takes the aforementioned three means as countermeasures. The three means will now be described.

<Means 1>

In the invention, the ADCK supplied from the CCD/preprocessing-LSI drive block 701 in the high-speed scanner control ASIC 135 to the ADCs 133 and 134 via an output buffer circuit 712 is made to also serve as a master clock signal for the image data processing system 707 incorporated in the ASIC 135 via a selector (SEL) 708 which is also incorporated in the ASIC 135 and will be described later.

This structure enables the high-speed scanner control ASIC 135 to perform synchronization of data input timing, on the basis of the ADCK, with respect to the data output from the ADCs 133 and 134 even when the timing of the drive pulses supplied from the CCD/preprocessing-LSI drive block 701 in the ASIC 135 to the CCD and the amplifiers (Amp) 131 and 132 are adjusted.

Since the output of pixel signals from the CCD 34 is based on drive pulses output from the high-speed scanner control ASIC 135, and the pixel signals are amplified by the amplifiers 131 and 132 and A/D converted by the ADCs 133 and 134, it is necessary to always keep an appropriate timing relationship between the drive pulses for the CCD 34 and the amplifiers 131 and 132 and the ADCK.

In other words, adjustment of the timing of drive pulses for the CCD 34 and the amplifiers 131 and 132 enables adjustment of the timing of the ADCK.

In addition, image data (DOX) A/D converted by the ADCs 133 and 134 is output in synchronism with the ADCK.

Accordingly, it is preferable to use, in the high-speed scanner control ASIC 135, the ADCK or an internal signal created in synchronism with the ADCK as a timing signal for latching input data.

Even when the ADCK is adjusted by adjusting the timing of each drive pulse for the CCD 34 and the amplifiers 131 and 132, the amount of adjustment is always canceled.

This means that the ADCK is used as the master clock signal of the image data processing system 707 in the high-speed scanner control ASIC 135.

<Means 2>

As another countermeasure, the invention is constructed such that the selector (SEL) 708 incorporated in the high-speed scanner control ASIC 135 selects one of a system in which the master clock signal (ADCK) for the image data processing system 707 in the ASIC 135 is directly supplied in the ASIC 135, and a system in which the ADCK output from the ASIC 135 to the ADCS 133 and 134 is supplied to the image data processing system 707 in a feedback manner via an input buffer circuit 713 through an exclusive input terminal (ADCKIN).

This selection is determined from the outside by setting a signal that is supplied to the selector via an input buffer circuit 714 through an exclusive external input terminal (CLKMOD) for mode setting provided in the high-speed scanner control ASIC 135.

When, for example, a signal supplied to the selector (SEL) 708 via the input buffer circuit 714 through the CLKMOD has a value of "1", the ADCKIN is used in "means 2".

When, on the other hand, a signal supplied to the selector (SEL) 708 via the input buffer circuit 714 through the CLKMOD has a value of "0", the ADCK is used in "means 2", as in "means 1".

Further, in "means 2", concerning the ADCK used as a master clock signal for the image data processing system 707 in the high-speed scanner control ASIC 135, using one of the ADCKIN and the ADCK is necessary to cancel the influence, upon the data latch timing, of a delay between the ADCK (which is output from the ASIC 135 to the ADCS 133 and 134) outside the ASIC 135 and the ADCK inside the ASIC 135 due to the transmission route condition on the substrate.

<Means 3>

As a further countermeasure, the invention is constructed such that a clock signal for latching input image data (DOX), used in the high-speed scanner control ASIC 135, is created by an exclusive input data latch clock generating circuit 709 that is provided in the ASIC 135 and uses an inverted master clock signal output from the selector (SEL) 708.

The image data (DOX) output from the ADCs 133 and 134 in accordance with the clock signal from the input data latch clock signal generating circuit 709 is once latched by the image data processing system 707 in the high-speed scanner control ASIC 135, and then again synchronized with the master clock signal.

Further, the input data latch timing using the input data latch clock signal from the input data latch clock signal generating circuit 709 can be programmed by, for example, the external CPU 706 by setting, at desired data, bit data corresponding to a signal output from an exclusive register (LTHMODX) for setting latch timing included in the setting REG group 705 in the high-speed scanner control ASIC 135.

The input data latch clock signal, having its generation timing set by the input data latch clock signal generating circuit 709 on the basis of a signal output from the exclusive register for setting latch timing, is supplied to the image data processing system 707 in the high-speed scanner control ASIC 135, thereby latching the image data (DOX) from the ADCs 133 and 134 at appropriate points in time which enable high speed operations of the apparatus.

Thus, when the invention is applied to, for example, the scanner control ASIC designed for a high-speed digital PPC, it can reliably fetch, in units of one pixel, image data of one line input at high speed, and also can eliminate differences in timing due to different mounting conditions.

As described above in detail, the invention can provide an image processing system including an image forming apparatus and its control method intended for using, as an image reading photoelectric conversion element in its scanner section, a 4-channel output CCD (charge coupled device) designed for a high-speed digital PPC, and capable of performing high-speed operations in a simple, reliable and accurate manner by, in particular, providing setting means for adjusting the timing of drive pulses corresponding to the specifications of the CCD and the preprocessing-LSI (Amp, ADC), and input means for reliably latching, on the scanner ASIC, image data output from the ADC in synchronism with an A/D conversion clock signal.

In addition, the invention can provide an image processing system including an image forming apparatus and its control method, which can performing high-speed operations in a simple, reliable and accurate manner when processing image data, supplied in the form of a read image signal, using, in particular, a scanner having, for example, a charge-coupled device as a photoelectric conversion element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

an accumulating section for accumulating, in elements of one line, electric signals obtained by subjecting optical image information to photoelectric conversion, said accumulating section containing the electric signals serving as 4-channel outputs, of even number components and odd number components, and the even number components and the odd number components being driven on the basis of control signals as 4-channel output structures divided into right and left components;

an image reading section for reading, in a plurality of determined directions, the electric signals accumulated in the elements of one line by the accumulating section, thereby synthesizing the electric signals, converting the synthesized electric signal into a digital signal on the basis of a pulse signal for digital conversion, and outputting the digital signal as input image data of one line;

an image data processing section for fetching, in units of one pixel, the input image data of one line output from the image reading section, thereby performing predetermined image data processing on the basis of a master clock signal;

a drive section for supplying the digital conversion pulse signal to be used in the image reading section, and the master clock signal to be used in the image data processing section, such that the digital conversion pulse signal can be used in place of the master clock signal, or vice versa, said drive section generating the control signals for driving said accumulating section;

a first timing setting section for programming timing of the digital conversion pulse signal supplied from the drive section;

an input data latching clock generating section for generating, on the basis of the master clock signal, an input data latching clock signal used to fetch the input image data in the image data processing section;

a synthesizing section for synthesizing, with the master clock signal, the input image data fetched based on the image data latching clock signal from the input data latching clock generating section; and a second timing setting section for programming timing of the input data latching clock signal from the input data latching clock generating section.

2. An apparatus according to claim 1, wherein the drive section supplies the accumulating section with a drive pulse signal for driving the accumulating section.

3. An apparatus according to claim 1, wherein the first and second timing setting sections include an exclusive register for setting a parameter for timing adjustment, and a CPU for setting desired data in the exclusive register for setting the parameter.

4. An apparatus according to claim 2, further comprising a third timing setting section for programming timing of the drive pulse signal supplied from the drive section.

5. An apparatus according to claim 4, wherein the third timing setting section includes an exclusive register for setting a parameter for timing adjustment, and a CPU for setting desired data in the exclusive register for setting the parameter.

6. An image processing method comprising the steps of:

preparing an accumulating section for accumulating, in elements of one line, electric signals obtained by subjecting optical image information to photoelectric conversion, said accumulating section containing the electric signals serving as 4-channel outputs, of even number components and odd number components, and the even number components and the odd number components being driven on the basis of control signals as 4-channel output structures divided into right and left components;

converting optical image information into electric signals and accumulating the electric signals in said accumulating section serving as elements of one line;

supplying a digital conversion pulse signal and a master clock signal such that the digital conversion pulse signal can be used in place of the master clock signal, or vice versa;

programming timing of the digital conversion pulse signal;

reading the electric signals from the elements of one line in a plurality of predetermined directions, thereby synthesizing the electric signals, converting the synthesized electric signal into a digital signal on the basis of the digital conversion pulse signal, and outputting the digital signal as input image data of one line;

generating an input data latching clock signal on the basis of the master clock signal;

programming timing of the input data latching clock signal;

fetching, in units of one pixel, the input image data of one line on the basis of the input data latching clock signal, and performing predetermined image data processing on the basis of the master clock signal; and synthesizing, with the master clock signal, the input image data fetched on the basis of the input data latching clock signal.

* * * * *